United States Patent
Ives

[11] Patent Number: 5,524,860
[45] Date of Patent: Jun. 11, 1996

[54] UNIVERSAL MOUNTING BRACKET AND METHOD

[76] Inventor: Lewis Ives, 7 Old Stone Way, Eastford, Conn. 06242

[21] Appl. No.: 314,891

[22] Filed: Sep. 29, 1994

[51] Int. Cl.$^6$ ................................................. F16M 3/00
[52] U.S. Cl. ........................................ 248/674; 62/465
[58] Field of Search ........................ 248/674, 635, 248/300, 544, 678, 220.2, 222.4, 223.1, 223.2, 223.3, 346; 62/465, 296

[56] References Cited

U.S. PATENT DOCUMENTS

| | | | |
|---|---|---|---|
| 2,316,389 | 4/1943 | Atkinson | 248/300 |
| 3,727,866 | 4/1973 | Drake | 248/674 |
| 4,920,696 | 5/1990 | Mawby et al. | 62/465 X |
| 4,962,908 | 10/1990 | Gerth et al. | 248/674 |
| 5,069,415 | 12/1991 | Mechalas | 248/674 |

*Primary Examiner*—Ramon O. Ramirez
*Attorney, Agent, or Firm*—John H. Crozier

[57] ABSTRACT

In a preferred embodiment, a universal mounting bracket, comprising: a plate member; means in said plate member to mount said mounting bracket to a first device; and adjustable means in said plate member to mount said mounting bracket to a second device, said second mounting device having any one of a number of mounting patterns.

18 Claims, 8 Drawing Sheets

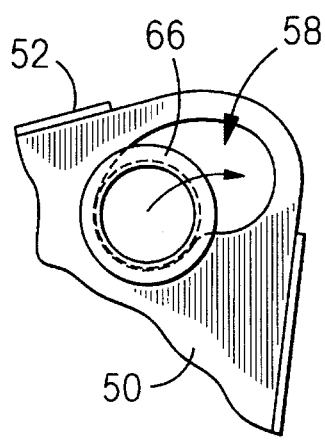
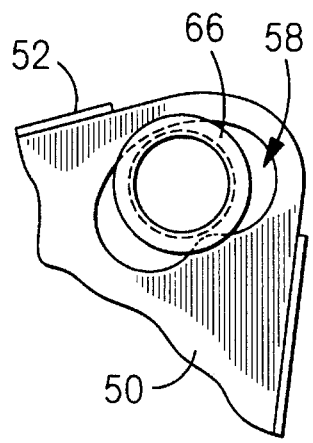
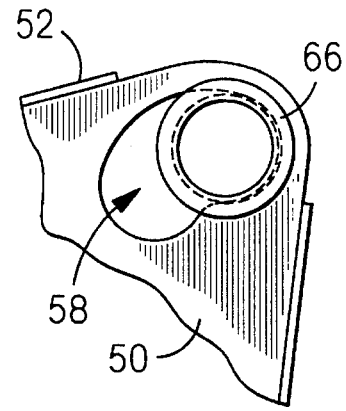
FIG. 6A  FIG. 6B  FIG. 6C
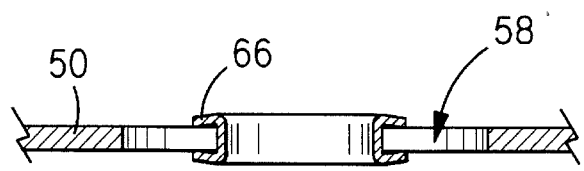
FIG. 7
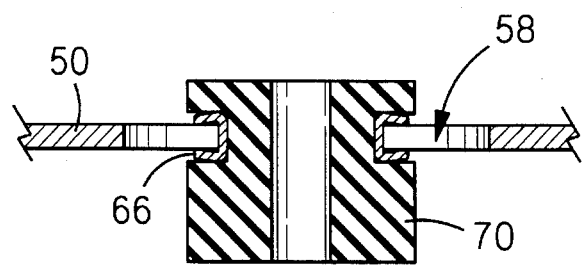
FIG. 8

UNIVERSAL MOUNTING BRACKET AND METHOD

BACKGROUND OF THE INVENTION

1. Field of the Invention

The present invention relates to mechanical equipment generally and, more particularly, to a novel mounting bracket for mounting small compressors to condenser plates, the latter having a variety of bolt patterns.

2. Background Art

While the present invention is described with reference to the mounting of compressors, it will be understood that it is adaptable to any situation in which a variety of mounting configurations must be accommodated.

Small refrigeration units are used, for example, at locations where ice is sold to keep the chests containing the ice below 32 degrees Fahrenheit. Typically, the compressors for such refrigeration units are mounted on the condenser plates of the refrigeration units. The compressors are relatively high maintenance items and must be occasionally replaced. Unfortunately, the bolt patterns on the condenser plates are far from uniform and, if a service organization services a large number of such installations, a large number of different compressors must be inventoried.

For example, a service organization may have to service hundreds of different ice merchandisers having ¼-, ⅓-, and ½-horsepower compressors purchased, say, over the past 25 years from various manufacturers. As a result, the mounting studs that hold the compressors to the rubber mounting spacers to the compressor mounting feet have many different configurations. If the configuration of the mounting studs does not match that of the configuration of the feet on a particular replacement compressor, then the entire condenser plate and assembly have to be removed and drilled to install new mounting studs. This consumes time and increases maintenance costs, as well as increasing the time the refrigeration unit is out of service. Another problem occurs because on some of the units, the old mounting studs are welded to the condenser plates and have to be removed to obtain clearance to mount the new compressors.

One of the three major so called "J style" compressor manufacturers makes all of its replacement compressors with the mounting feet welded to the compressors. This manufacturer make these compressors with three different base configurations and does not supply any adaptors. If the service organization carries the three types of compressors in ¼-, ⅓-, and ½-horsepower sizes, nine different compressors must be inventoried and carried on the service vehicle. Many times, these compressors do not match the configurations previously used by the manufacturer as well as those of other manufacturers. Replacing the compressors becomes a compounded problem.

Another one of the three major "J style" compressor manufacturers also makes all of its replacement compressors with the mounting feet welded to the compressors and it presently makes compressors with five different base configurations; however, this company does supply some single use adapters. If the service organization carries all five types in the above three sizes, as well as adapters therefor, the inventorying problem grows substantially and, even at that, much of the time these do not match the configurations previously used by this manufacturer as well as some currently being used by the other manufacturers.

The other one of the three major "J style" manufacturers makes some if its replacement compressors with the mounting feet welded to the compressors, but they also make replacement compressors without a welded base to accept a bolt-on base. This manufacturer supplies seven difference single use base configuration which are not interchangeable. Again, even if the service organization carries all seven bases, with their ¼-, ⅓-, and ½-horsepower compressors, much of the time these do not match the configurations previously used by this manufacturer as well as some currently being used by the other manufacturers.

There are several independent suppliers of adaptors all of which are either single use or which mount each stud mount independently to the compressor without the security of a solid base. Some are very thin strips with interfitting sliding channels secured with wing nuts under the compressor. These wing nuts sometimes hit the compressor and/or vibrate loose. There are others that are attached directly to the mounting studs without the value of the use of a rubber mounting spacer.

Accordingly, it is a principal object of the present invention to provide a universal mounting bracket and method of use that can be employed to mount compressors to condenser plates when the condenser plates have a wide variety of mounting stud patterns.

It is a further object of the invention to provide such a mounting bracket which is sturdy.

It is an additional object of the invention to provide such bracket and method that are convenient to employ.

It is another object of the invention to provide such bracket that is economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a universal mounting bracket, comprising: a plate member; means in said plate member to mount said mounting bracket to a first device; and adjustable means in said plate member to mount said mounting bracket to a second device, said second mounting device having any one of a number of mounting patterns.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIGS. 6A–6C, 7 and 8 are fragmentary views illustrating details of the arrangement of the present invention for attaching the universal mounting bracket to a compressor plate.

DETAILED DESCRIPTION OF THE PREFERRED EMBODIMENTS

Figure 1:
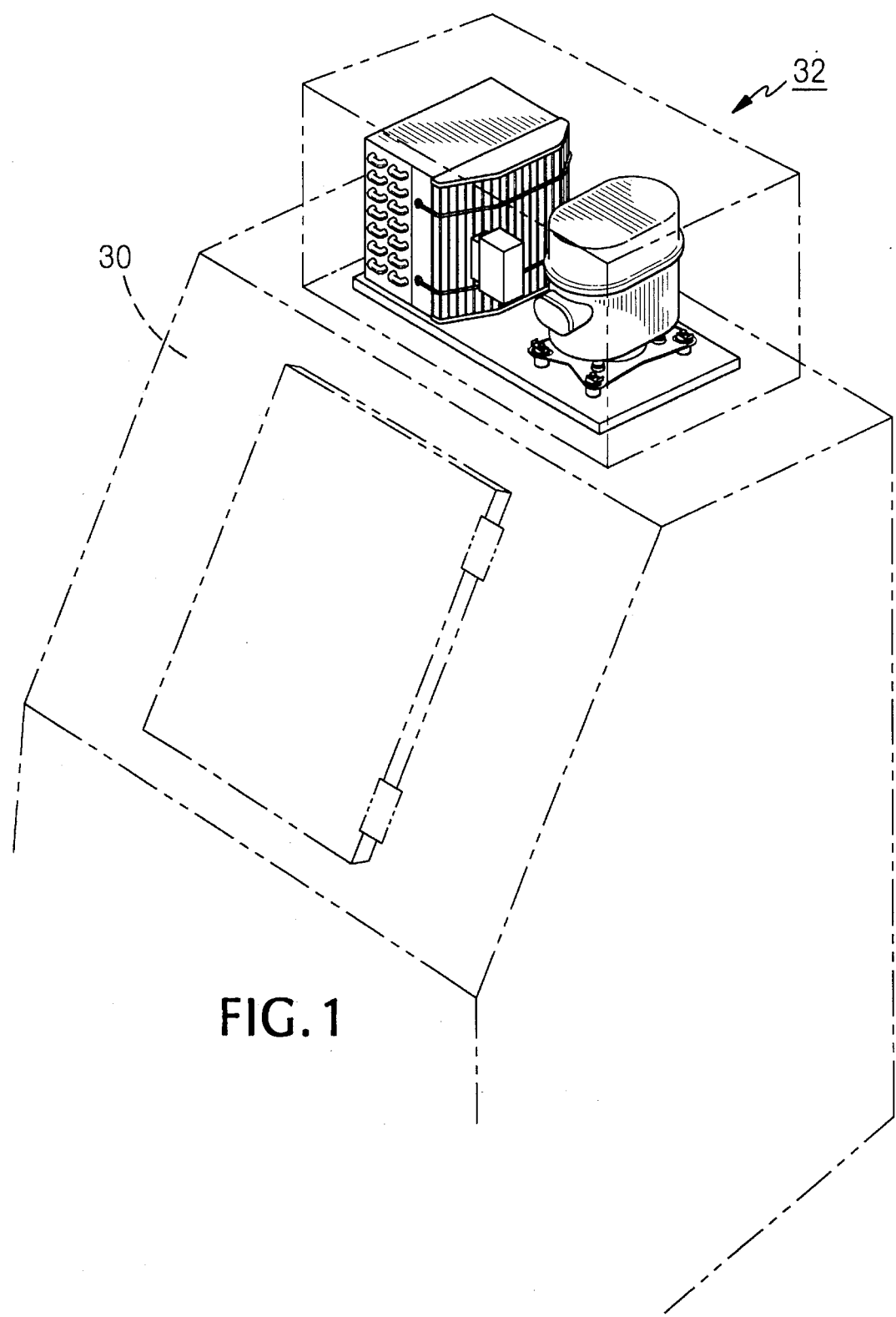
FIG. 1 is perspective view of a compressor attached to a refrigeration unit mounted on an ice container, according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a familiar type of chest 30 which may be located in a merchandising establishment and may contain blocks and/or cubes of ice for sale. Mounted on chest 30 is a refrigeration unit, generally indicated by the reference numeral 32, which is employed to keep the contents of the chest below 32 degrees Fahrenheit.

Figure 3:
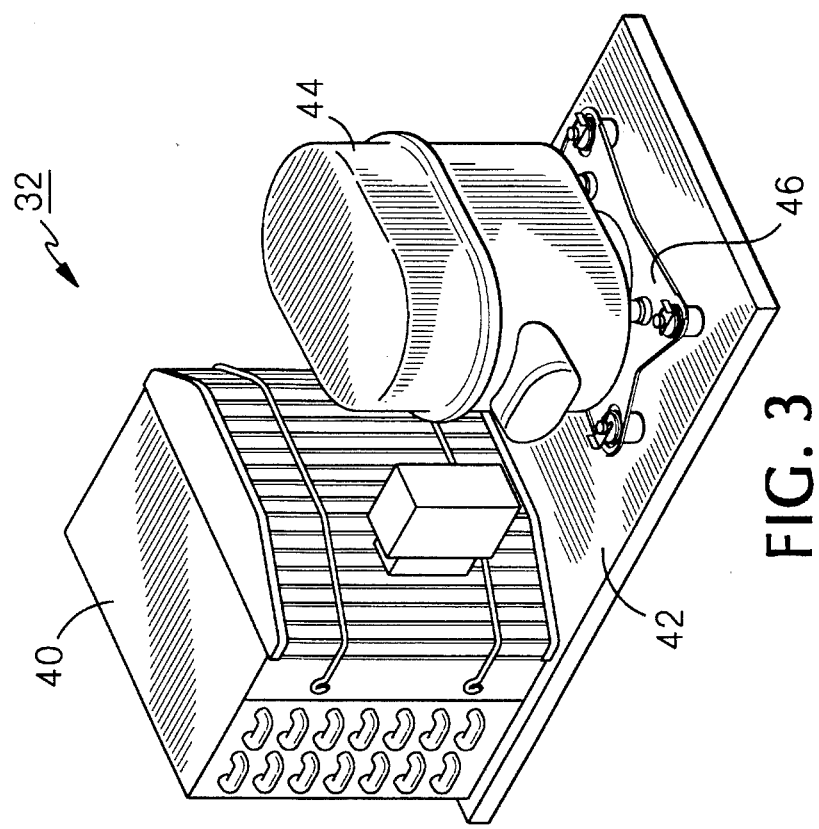
FIGS. 2 and 3 an isometric views showing, in more detail, the means of attachment of the compressor of FIG. 1.
Figure 2:
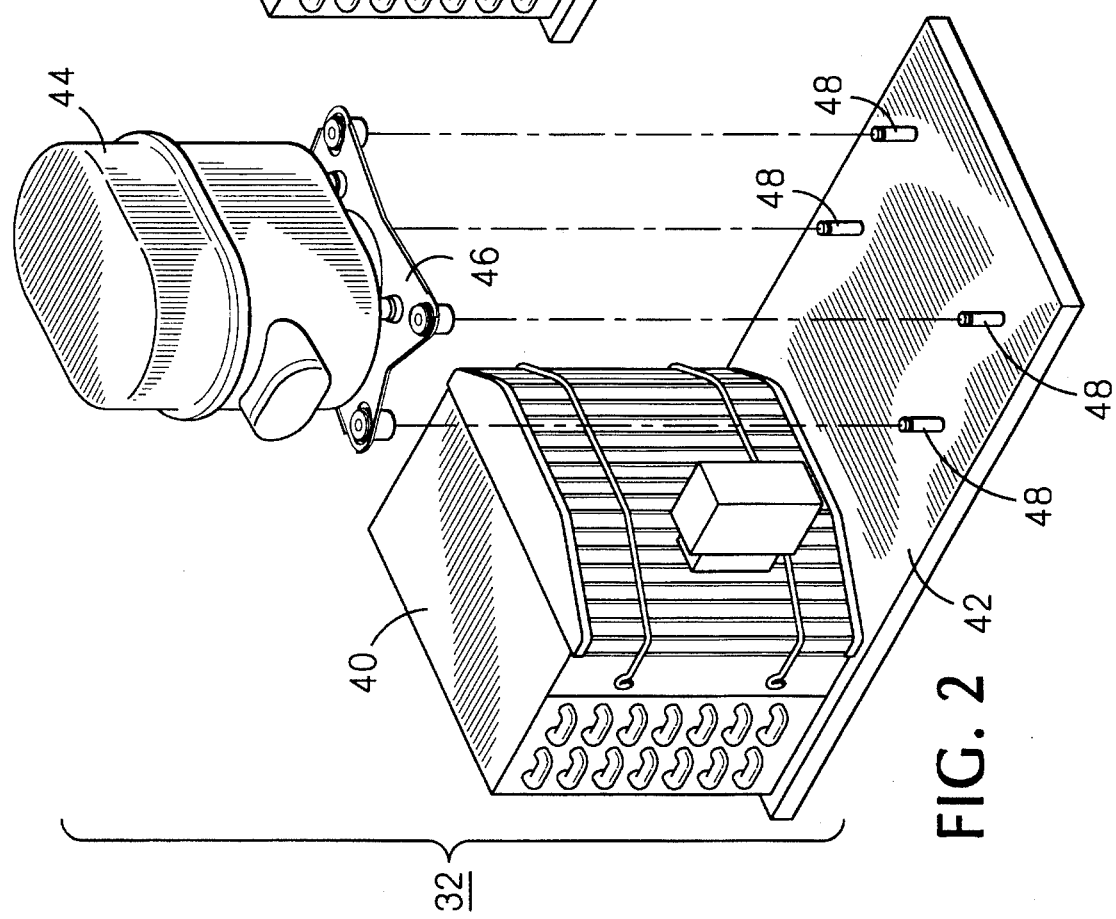

FIGS. 2 and 3 illustrate more clearly some of the details of refrigeration unit 32. Refrigeration unit 32 includes a control and condenser unit 40 attached to a condenser plate 42. Also attached to condenser plate 42 is a compressor 44, which may be of the type described above, and which has attached to the base thereof a universal mounting bracket 46 constructed according to the present invention. Mounting bracket 46 is configured to be attached to four mounting studs 48 (FIG. 2) which are attached to condenser plate 42, even though the mounting studs may be in any one of a wide variety of patterns. As noted above, absent the use of universal mounting bracket 46, a service organization might have to inventory many different compressors and/or single use adapters.

Figure 4:
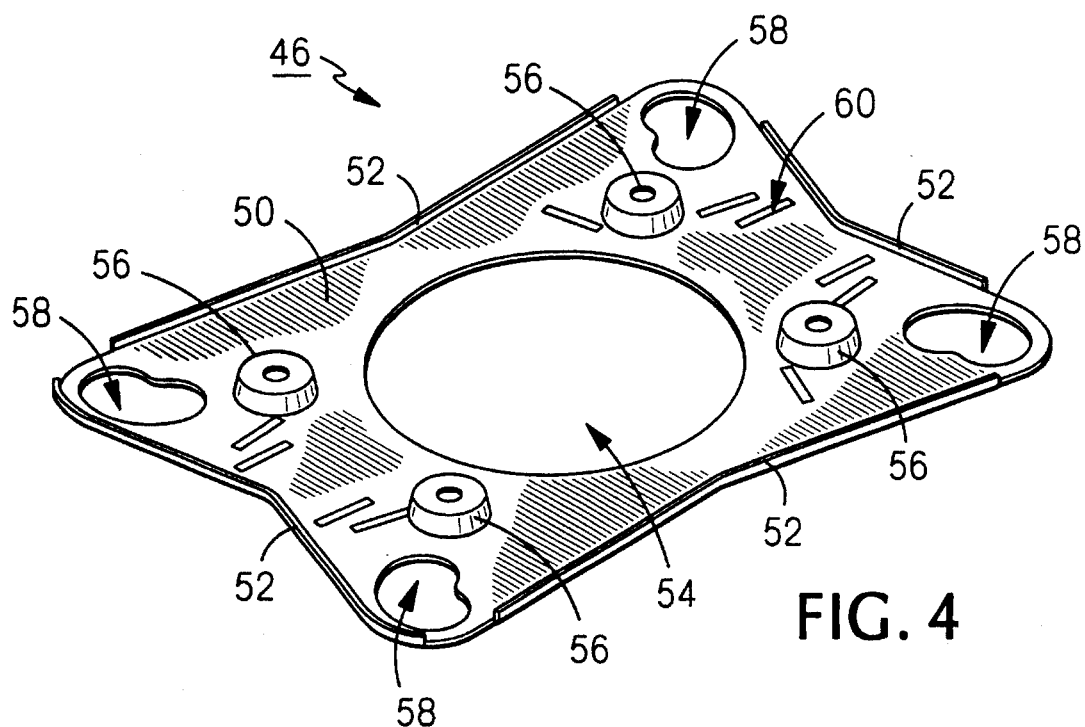
FIGS. 4 and 5 are isometric views of the universal mounting bracket of the present invention.

FIG. 4 illustrates the basic member of universal bracket 46, that being a stamped plate 50 having orthogonally upturned reinforcing flanges 52 formed integrally with the plate. The edges of plate 50 are somewhat V-shaped to provide mechanical clearance required in some installations. A large opening 54 is defined through plate 50 centrally thereof to provide clearance for the bottoms of certain types of compressors. Plate 50 includes four bosses 56 on the upper surface thereof for the bolting of the plate to a compressor. Nearly all of the compressors of the type under consideration have a fairly consistent bolting pattern; however, plate 50 may be arranged to accommodate variations in bolting pattern, as will be described later. Plate 50 also includes four arcuate openings 58 defined therethrough near the corners of the plate and a plurality of slots, as at 60, defined therethrough, the arcuate openings and the slots being employed for the mounting of bracket to condenser plate 42 (FIG. 2) as is described below.

Figure 5:
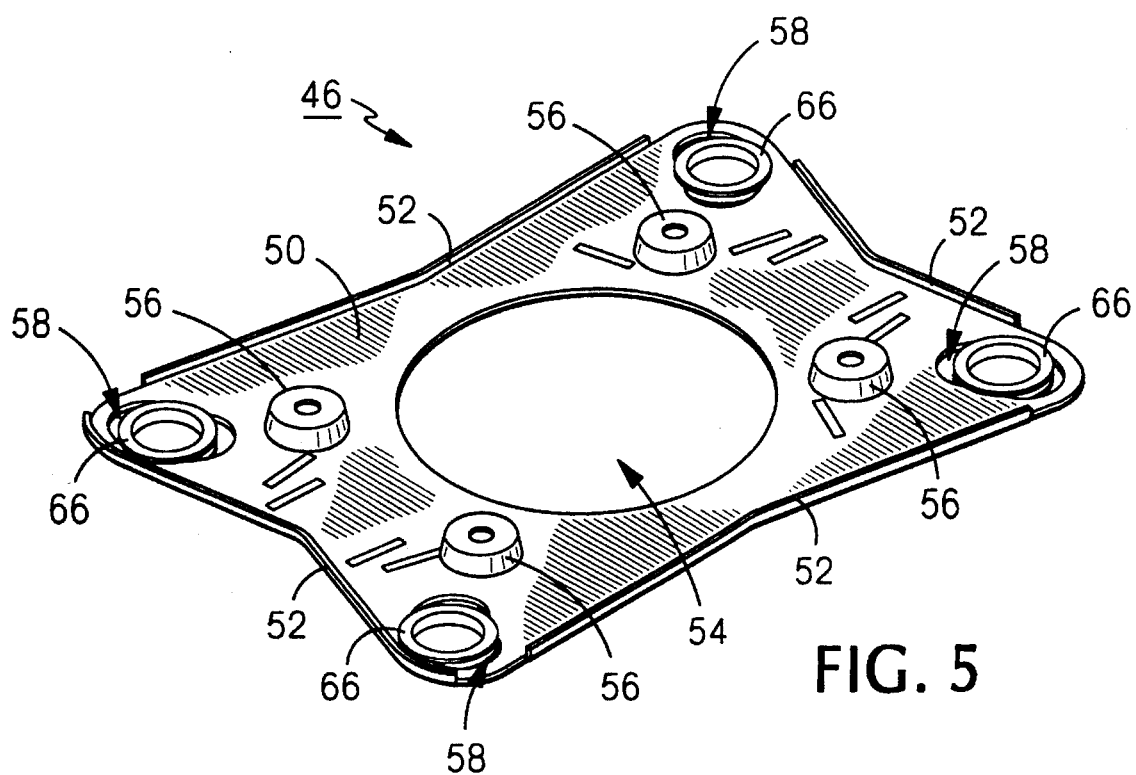

FIG. 5 shows rings 66 die pressed into arcuate openings 58 to provide for one mode of use of mounting bracket 46. FIGS. 6A–C illustrate a ring 66 in three different positions in an opening 58 to accommodate three different positions of a mounting stud 48 (FIG. 2) on condenser plate 42 (neither shown on FIGS. 6A–C). Since three points define an arc, the shape of arcuate opening 58 can be selected to accommodate the three different positions. Of course, ring 66 can accommodate any stud positions in between the three indicated on FIGS. 6A–C. It will be understood that the other rings 66 will be likewise adjusted for the particular stud pattern being accommodated.

With reference to FIG. 7, it can be seen that ring 66 comprises an outwardly open, circular channel member with the sides of the ring being pressed around the upper and lower surfaces of plate 50 to grippingly secure the ring in arcuate opening 58.

FIG. 8 illustrates a rubber mounting spacer 70 grippingly inserted in ring 66 to absorb compressor vibrations in the manner of original compressor installations.

Figure 9:
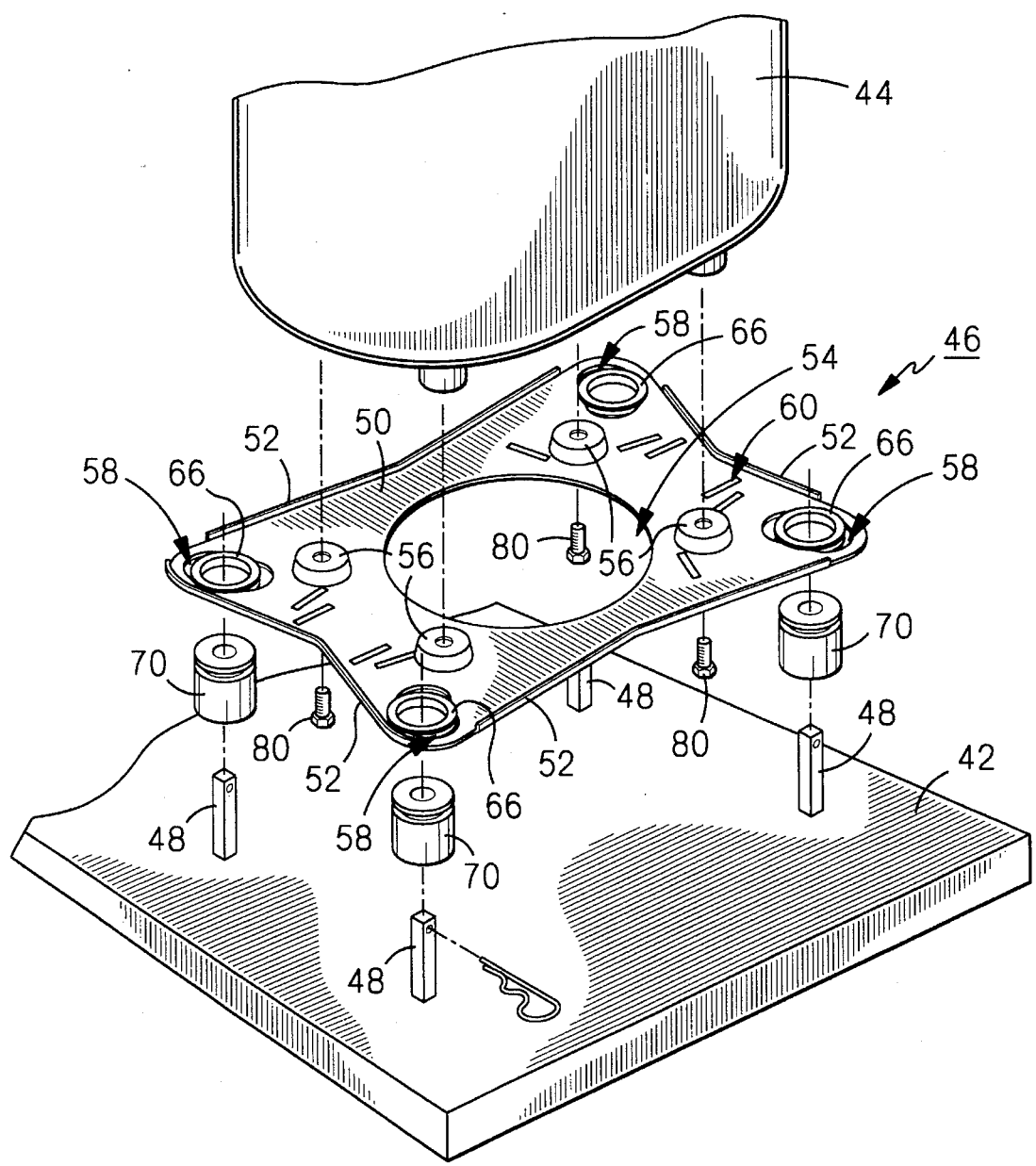
FIG. 9 is a perspective view illustrating, in detail, the use of the universal mounting bracket of the present invention.

FIG. 9 illustrates, in detail, the mounting of compressor 44 to condenser plate 42 using universal mounting bracket 46. Bracket 46 is first attached to the base of compressor 44 by means of four screws 80 (only three shown on FIG. 9) inserted through bosses 56 into the base of the compressor. Four rubber mounting spacers 70 (only three shown on FIG. 9) are inserted in rings 66 and the rings rotated in arcuate openings 58 to match the pattern of mounting studs 48 on condenser plate 42. Then, mounting bracket 46 with compressor 44 attached thereto is set on condenser plate 42 with mounting studs 48 extending through rings 66 and four pins 88 (only one shown on FIG. 9) inserted through the distal ends of the mounting studs. It will be understood that mounting bracket 46, configured as shown, can be employed to accommodate any stud pattern having spacings fitting within the scope of adjustment of rings 66.

Figure 10:
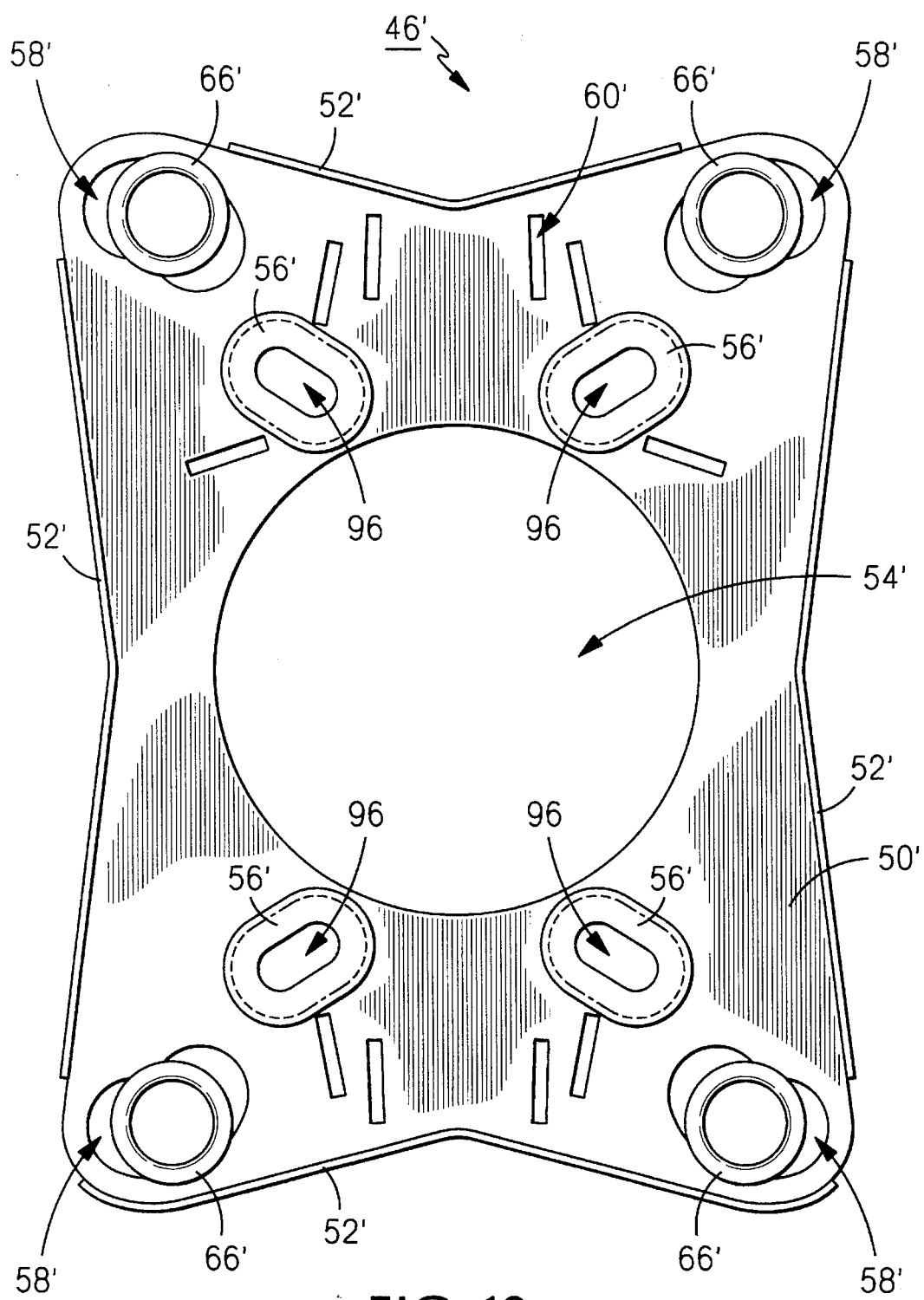
FIG. 10 illustrates an alternative embodiment of the universal bracket of the present invention.

FIG. 10 illustrates another embodiment of the universal mounting bracket of the present invention, generally indicated by the reference numeral 46'. Elements of mounting bracket 46' which are the same as or similar to the elements of mounting bracket 46 (FIG. 5) are given primed reference numerals. Mounting bracket 46' is configured to accommodate different compressor mounting patterns. This is accomplished by providing bosses 56' with oval openings 96 therein to accommodate rectangular mounting patterns or greater or lesser size.

Figure 11:
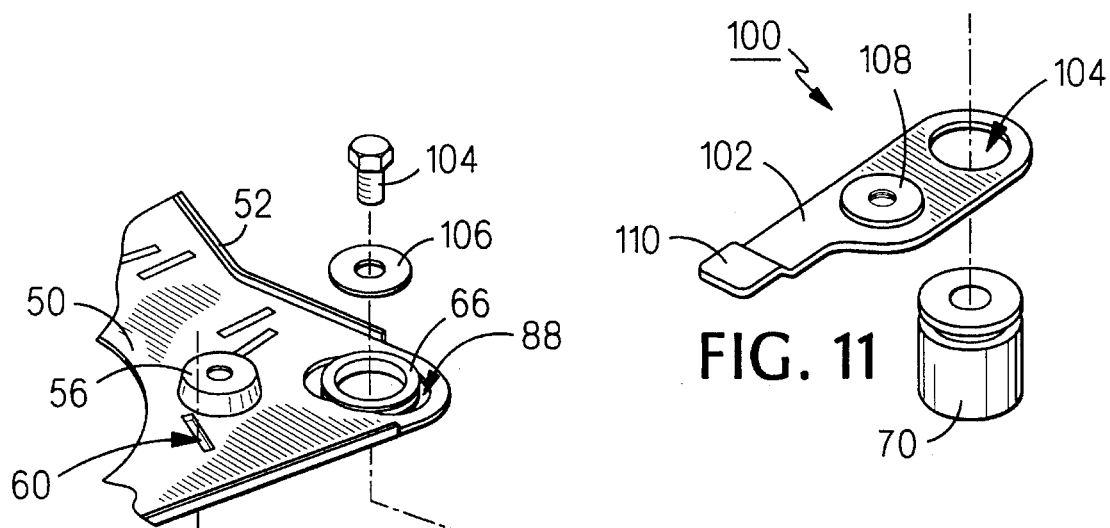
FIGS. 11–14 illustrate mounting foot extensions for use with the universal mounting bracket, according to the present invention.

Plate 50 of mounting bracket 46 is sized so that it may be employed with the smallest mounting pattern to be accommodated. However, this means that arcuate openings 58 cannot be solely employed with larger mounting patterns. FIG. 11 illustrates a mounting foot extension, generally indicated by the reference numeral 100, which includes a primary plate portion 102 having an opening 104 defined through the distal end thereof, the opening being sized to receive therein a rubber mounting spacer 70. Mounting foot extension 100 is attached to plate 50, as indicated on FIG. 12, by means of a elevated tab formed at the proximal end of the foot extension, parallel with the primary plate portion, and insertable in a slot 60 in plate 50. A screw 104 extends through a washer 106 on ring 66 and is inserted into a threaded boss 108 which is sized to closely fit into the ring, thus locking mounting foot 100 into plate 50 and providing an extended mounting spacer 70 for the insertion therein of a mounting stud 48 (FIG. 9) as is described above.

Figure 12:
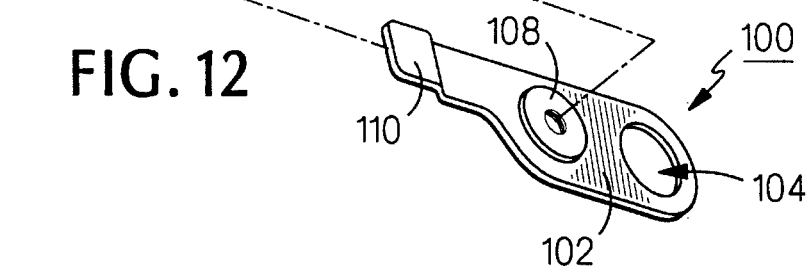
Figure 13:
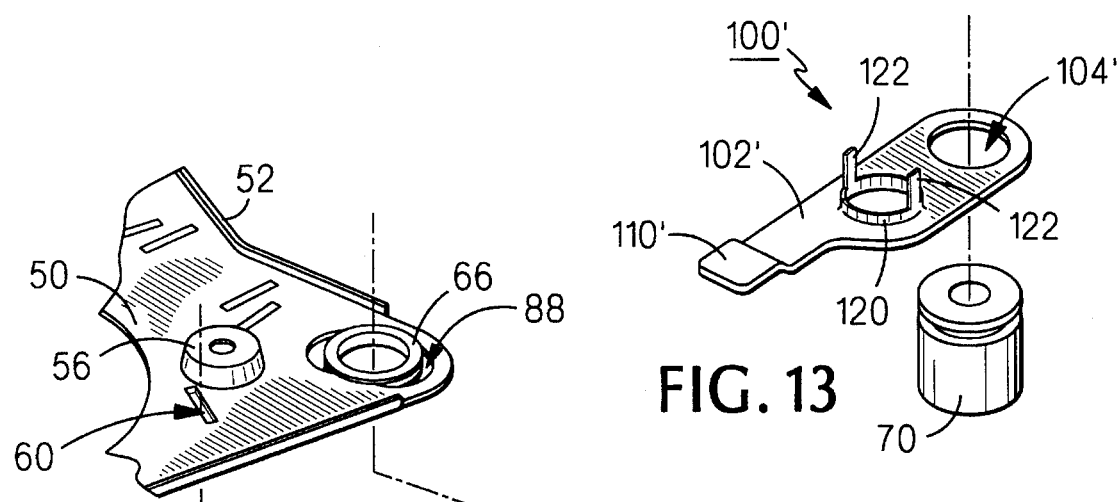
Figure 14:
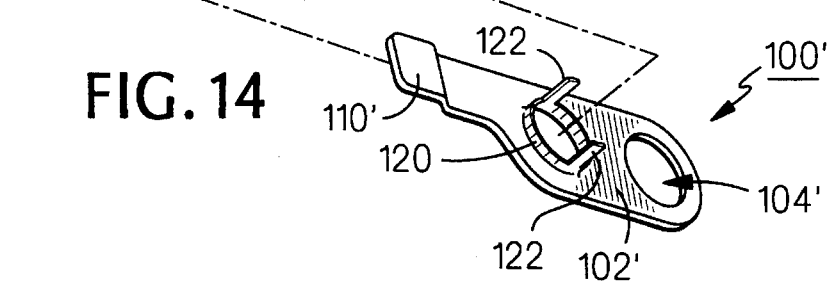
Figure 15A:
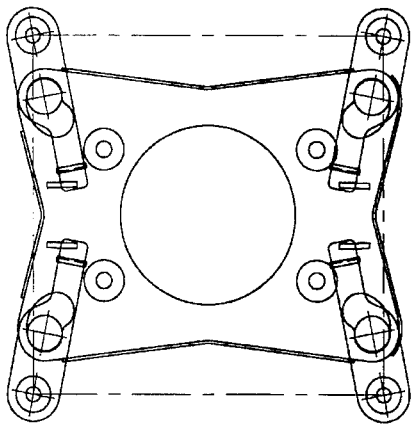
FIGS. 15A–15F are top plan views illustrating some of the different mounting configurations that can be accommodated by the universal mounting bracket.
Figure 15B:
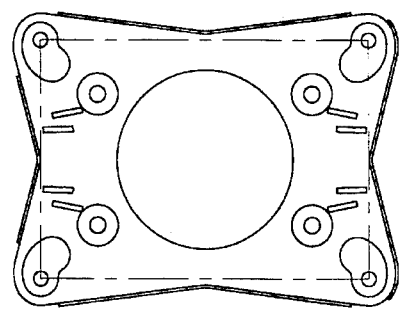
Figure 15C:
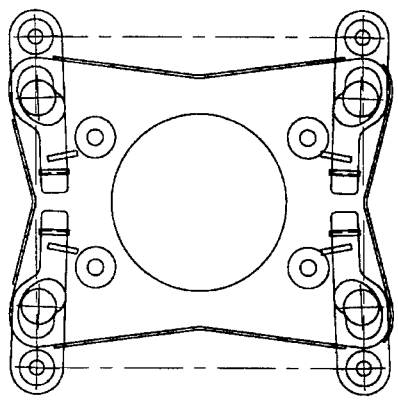
Figure 15D:
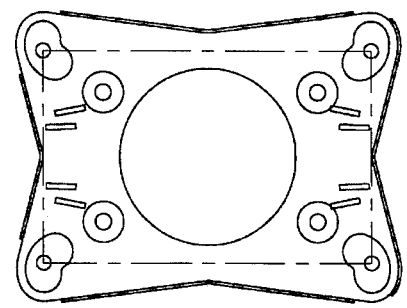
Figure 15E:
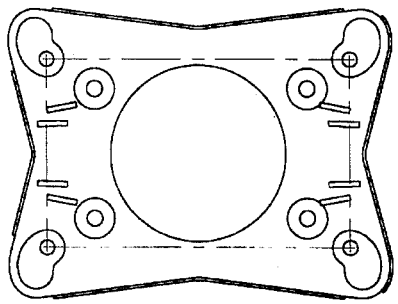
Figure 15F:
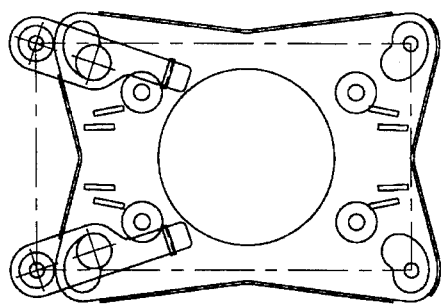

FIGS. 13 and 14 illustrate an alternative embodiment of a mounting foot, generally indicated by the reference numeral 100', the elements thereof which are the same as or similar to the elements of mounting foot 100 (FIGS. 11 and 12) being given primed reference numerals. Mounting foot 100' includes a ring shaped flange 120 orthogonal to primary plate 102', with upwardly extending tabs 122. Flange 120 is sized to closely fit in ring 66 with tabs 122 bent over the upper surface of the ring.

FIGS. 15A–15F illustrate some of the mounting patterns that can be accommodated by mounting bracket 46. While the patterns shown are all rectangular, it will be understood that triangular patterns may be accommodated also by suitable selection of the rings 66 (FIG. 9) and/or foot extensions 100 (FIG. 12).

Mounting bracket 100 is sturdy and can be economically constructed from any suitable materials by conventional fabrication methods.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A universal mounting bracket, comprising:
   (a) a generally planar plate member;
   (b) mounting means in said plate member to mount said mounting bracket to a first device, said mounting means being disposed in a central portion of said plate member; and
   (c) adjustable mounting means in said plate member to selectively mount said mounting bracket to second devices, said second devices having two or more mounting patterns, said adjustable mounting means being at least three in number and being disposed outwardly of said central portion on different azimuths with respect thereto.

2. A universal mounting bracket, as defined in claim 1, wherein said adjustable mounting means includes: at least one elongate opening defined through said plate member, said at least one elongate opening having secured therein a ring member having a central opening, said ring member being selectively movable along said elongate opening to be located over mounting means on one of said second devices.

3. A universal mounting bracket, as defined in claim 2, wherein said ring member comprises: an outwardly open, circular channel having side members engaging upper and lower surfaces of said plate.

4. A universal mounting bracket, as defined in claim 2, wherein: said elongate opening is arcuate and is defined by three positions of mounting means on three of said second devices.

5. A universal mounting bracket, as defined in claim 1, wherein said adjustable mounting means comprises:
   (a) an elongate leg member;
   (b) an opening defined through a distal end of said elongate leg member sized to receive therethrough mounting means for one of said second devices;
   (c) first attachment means at a proximal end of said elongate leg member;
   (d) second attachment means at a medial portion of said elongate leg member; and
   (e) said first and second attachment means being attachable, respectively, to first and second openings in said plate member.

6. A universal mounting bracket, as defined in claim 5, wherein said first attachment means comprises: an elevated tab, parallel to said elongate leg member, and insertable in a slot defined through said plate.

7. A universal mounting bracket, as defined in claim 2, wherein said adjustable mounting means includes:
   (a) an elongate leg member;
   (b) an opening defined through a distal end of said elongate leg member sized to receive therethrough mounting means for one of said second devices;
   (c) first attachment means at a proximal end of said elongate leg member;
   (d) second attachment means at a medial portion of said elongate leg member;
   (e) said first attachment means being attachable to an opening defined through said plate; and
   (f) said second attachment means being attachable to said ring member, with said leg member extending outwardly of a peripheral edge of said plate with said opening defined through said distal end of said leg member being disposed outwardly of said peripheral edge.

8. A method of mounting a first device to a second device, comprising:
   (a) providing a generally planar plate member having means therein to mount said mounting bracket to a first device and adjustable mounting means disposed outwardly of a central portion of said plate member to selectively mount said mounting bracket to second devices, said second devices having two or more mounting patterns, said adjustable mounting means being at least three in number and being disposed outwardly of said central portion on different azimuths with respect thereto;
   (b) adjusting said adjustable mounting means to match a pattern of mounting means on one of said second devices; and
   (c) mounting said mounting bracket, with said first device attached thereto, to said one of said second devices.

9. A method, as defined in claim 8, further comprising: providing at least one elongate opening defined through said plate member, said at least one elongate opening having secured therein a ring member having a central opening, said ring member being selectively movable along said elongate opening to be located over mounting means on one of said second devices.

10. A method, as defined in claim 9, further comprising: providing said ring member as an outwardly open, circular channel having side members engaging upper and lower surfaces of said plate.

11. A method, as defined in claim 9, further comprising: providing said elongate opening of arcuate shape and defined by three positions of mounting means on three of said second devices.

12. A method, as defined in claim 8, further comprising: providing said adjustable mounting means having:
   (a) an elongate leg member;
   (b) an opening defined through a distal end of said elongate leg member sized to receive therethrough mounting means for one of said second devices;
   (c) first attachment means at a proximal end of said elongate leg member; p1 (d) second attachment means at a medial portion of said elongate leg member; and
   (e) said first and second attachment means being attachable, respectively, to first and second openings in said plate member.

13. A method, as defined in claim 12, further comprising: providing said first attachment means as an elevated tab, parallel to said elongate leg member, and insertable in a slot defined through said plate.

14. A method, as defined in claim 9, further comprising: providing said adjustable mounting means having:
(a) an elongate leg member;
(b) an opening defined through a distal end of said elongate leg member sized to receive therethrough mounting means for one of said second devices;
(c) first attachment means at a proximal end of said elongate leg member;
(d) second attachment means at a medial portion of said elongate leg member;
(e) said first attachment means being attachable to an opening defined through said plate; and
(f) said second attachment means being attachable to said ring member, with said leg member extending outwardly of a peripheral edge of said plate with said opening defined through said distal end of said leg member being disposed outwardly of said peripheral edge.

15. A universal mounting bracket, comprising:
(a) a plate member;
(b) mounting means in said plate member to mount said mounting bracket to a first device; and
(c) adjustable mounting means in said plate member to selectively mount said mounting bracket to second devices, said second devices having two or more mounting patterns; wherein said adjustable mounting means comprises:
(i) an elongate leg member;
(ii) an opening defined through a distal end of said elongate leg member sized to receive therethrough mounting means for one of said second devices;
(iii) first attachment means at a proximal end of said elongate leg member;
(iv) second attachment means at a medial portion of said elongate leg member; and
(v) said first and second attachment means being attachable, respectively, to first and second openings in said plate member.

16. A universal mounting bracket, as defined in claim 15, wherein said first attachment means comprises: an elevated tab, parallel to said elongate leg member, and insertable in a slot defined through said plate.

17. A universal mounting bracket, as defined in claim 15, wherein said adjustable mounting means includes: at least one elongate opening defined through said plate member, said at least one elongate opening having secured therein a ring member having a central opening, said ring member being selectively movable along said elongate opening to be located over mounting means on one of said second devices.

18. A universal mounting bracket, as defined in claim 17, wherein said ring member comprises: an outwardly open, circular channel having side members engaging upper and lower surfaces of said plate.

* * * * *